United States Patent
Fan et al.

(10) Patent No.: US 11,231,717 B2
(45) Date of Patent: Jan. 25, 2022

(54) AUTO-TUNING MOTION PLANNING SYSTEM FOR AUTONOMOUS VEHICLES

(71) Applicant: Baidu USA LLC, Sunnyvale, CA (US)

(72) Inventors: Haoyang Fan, Sunnyvale, CA (US); Qi Kong, Sunnyvale, CA (US); Zhongpu Xia, Sunnyvale, CA (US); Changchun Liu, Sunnyvale, CA (US); Yaqin Chen, Sunnyvale, CA (US); Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 452 days.

(21) Appl. No.: 16/184,743

(22) Filed: Nov. 8, 2018

(65) Prior Publication Data

US 2020/0150671 A1 May 14, 2020

(51) Int. Cl.
*G05D 1/02* (2020.01)
*G05D 1/00* (2006.01)

(52) U.S. Cl.
CPC ......... *G05D 1/0221* (2013.01); *G05D 1/0088* (2013.01); *G05D 1/0248* (2013.01); *G05D 1/0257* (2013.01); *G05D 1/0268* (2013.01); *G05D 1/0278* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 10,831,208 B2* | 11/2020 | Kusari | G05D 1/0221 |
| 2010/0106603 A1* | 4/2010 | Dey | G01C 21/3617 |
| | | | 705/14.63 |
| 2017/0213151 A1* | 7/2017 | Uchibe | G06N 7/005 |
| 2018/0124423 A1* | 5/2018 | Choi | G06N 3/0445 |
| 2019/0310627 A1* | 10/2019 | Halder | B60W 50/14 |
| 2019/0310636 A1* | 10/2019 | Halder | G05D 1/0221 |
| 2019/0310649 A1* | 10/2019 | Halder | G06N 3/006 |
| 2019/0310650 A1* | 10/2019 | Halder | G06N 3/006 |
| 2019/0310654 A1* | 10/2019 | Halder | G05D 1/0088 |

OTHER PUBLICATIONS

Duan, Wuyang, Learning State Representations for Robotic Control, Oct. 23, 2017, Master of Science Thesis at Delft University of Technology (Year: 2017).*
Google search for inverse optimal control (Year: 2020).*
Haoyang Fan et al., "An Auto-tuning Framework for Autonomous Vehicles", arXiv:1808.04913v1, https://arxiv.org/abs/1808.04913, 7 pages, Aug. 14, 2018.

* cited by examiner

*Primary Examiner* — Nicholas K Wiltey
(74) *Attorney, Agent, or Firm* — Womble Bond Dickinson (US) LLP

(57) ABSTRACT

According to an embodiment, a system generates a number of sample trajectories from a trajectory sample space for a driving scenario. The system determines a reward based on a reward model for each of the sample trajectories, where the reward model is generated using a rank based conditional inverse reinforcement learning algorithm. The system ranks the sample trajectories based on the determined rewards. The system determines a highest ranked trajectory based on the ranking. The system selects the highest ranked trajectory to control the ADV autonomously according to the highest ranked trajectory.

20 Claims, 13 Drawing Sheets

AUTO-TUNING MOTION PLANNING SYSTEM FOR AUTONOMOUS VEHICLES

TECHNICAL FIELD

Embodiments of the present disclosure relate generally to operating autonomous vehicles. More particularly, embodiments of the disclosure relate to an auto-tuning motion planning system for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Scalability of motion planner is essential for level 4 autonomous driving vehicles in an industrial level. Typically, a motion planner system is required to plan for a number of different driving scenarios. The motion planning tunes one or more parameters of objective functions to generate driving trajectories. Although parameters tuning may be manually performed by humans, it becomes harder as the number of scenarios grows. Thus, there is a need for an auto-tuning framework to speed up the process.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the disclosures disclose an auto-tuning motion planning system for an ADV. The motion planning system can generate a trajectory using an auto-tuned reward model. The reward model can include a reward or cost function. According to one aspect, a system generates a number of sample trajectories from a trajectory sample space for a driving scenario. The system determines a reward based on a reward model for each of the sample trajectories, where the reward model is generated using a rank based conditional inverse reinforcement learning algorithm. The system ranks the sample trajectories based on the determined rewards. The system determines a highest ranked trajectory based on the ranking. The system selects the highest ranked trajectory to control the ADV autonomously according to the highest ranked trajectory.

According to a second aspect, a system determines a target (e.g., demonstrative) trajectory based on driven trajectories collected from a number of vehicles based on a driving scenario. The system generates a number of sample trajectories from a trajectory sample space for the driving scenario. The system generates a reward model by applying a rank based conditional inverse reinforcement learning algorithm based on the sample trajectories and the target trajectory.

Figure 1:
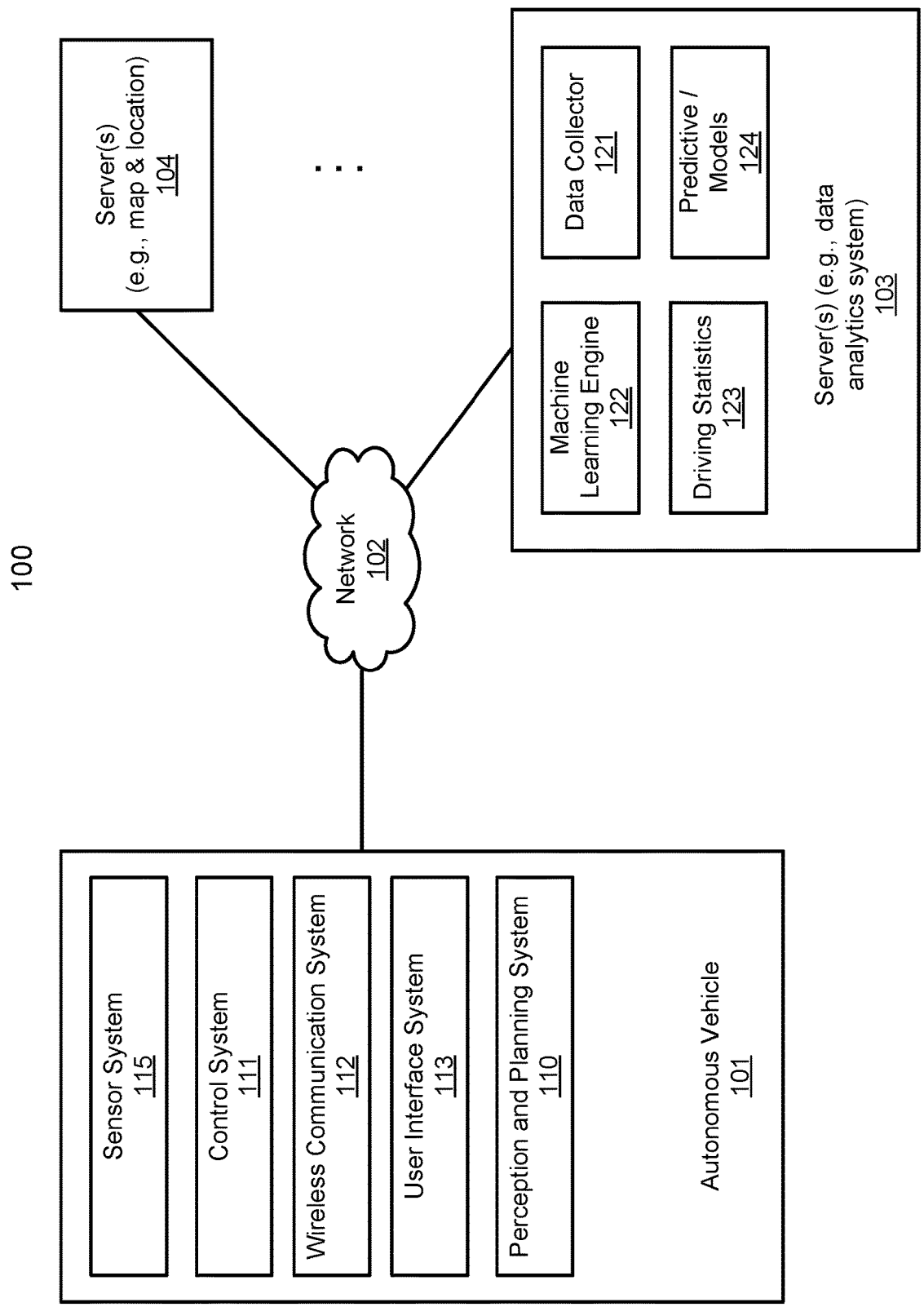
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle communication standard designed to allow microcontrollers and devices to communicate with each other in applications without a host computer. It is a message-based protocol, designed originally for multiplex electrical wiring within automobiles, but is also used in many other contexts.

Figure 2:
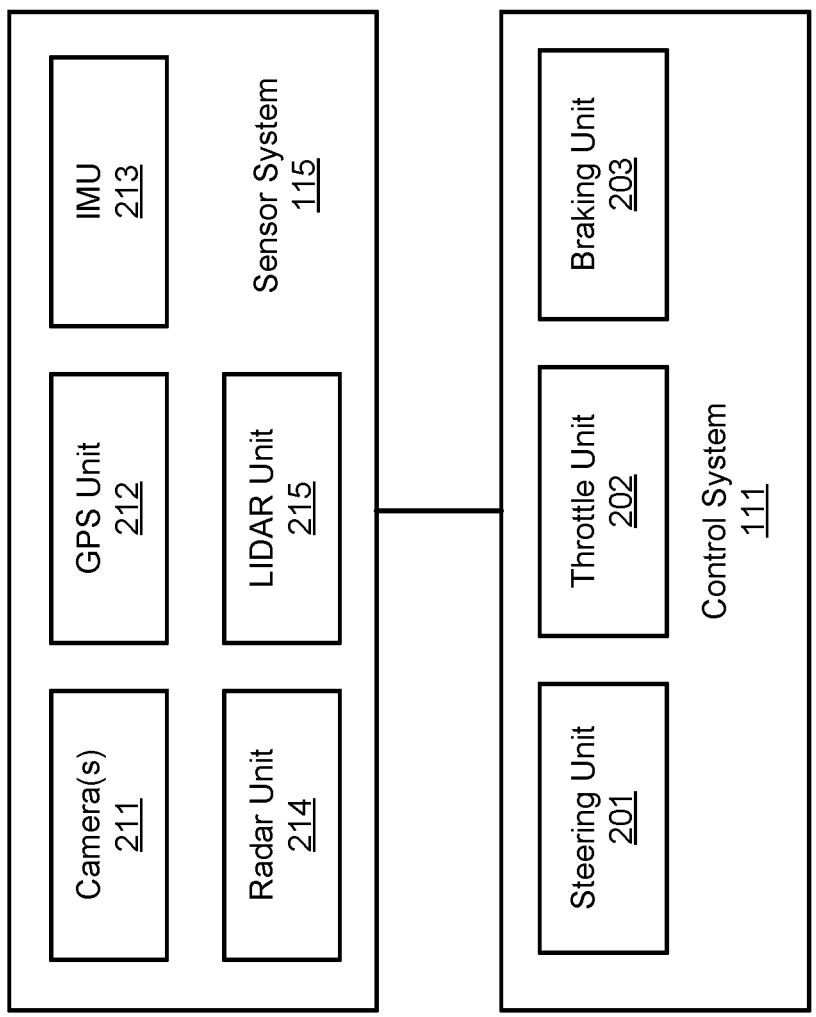
FIG. 2 is a block diagram illustrating an example of a sensor and control system using by an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be stationary cameras and/or PTZ (pan-tilt-zoom) cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor (e.g., electric power steering (EPS)) may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

Vehicle control system 111 can include, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or models 124 for a variety of purposes. In one embodiment, for example, algorithms/model 124 may include one or more reward models (as part of reward/cost models 313) as linear combinations of features, or machine learning reward models to model reward/cost functions. The reward models can be trained and uploaded onto ADVs to be used for autonomous driving by the ADVs, in real-time.

Figure 3A:
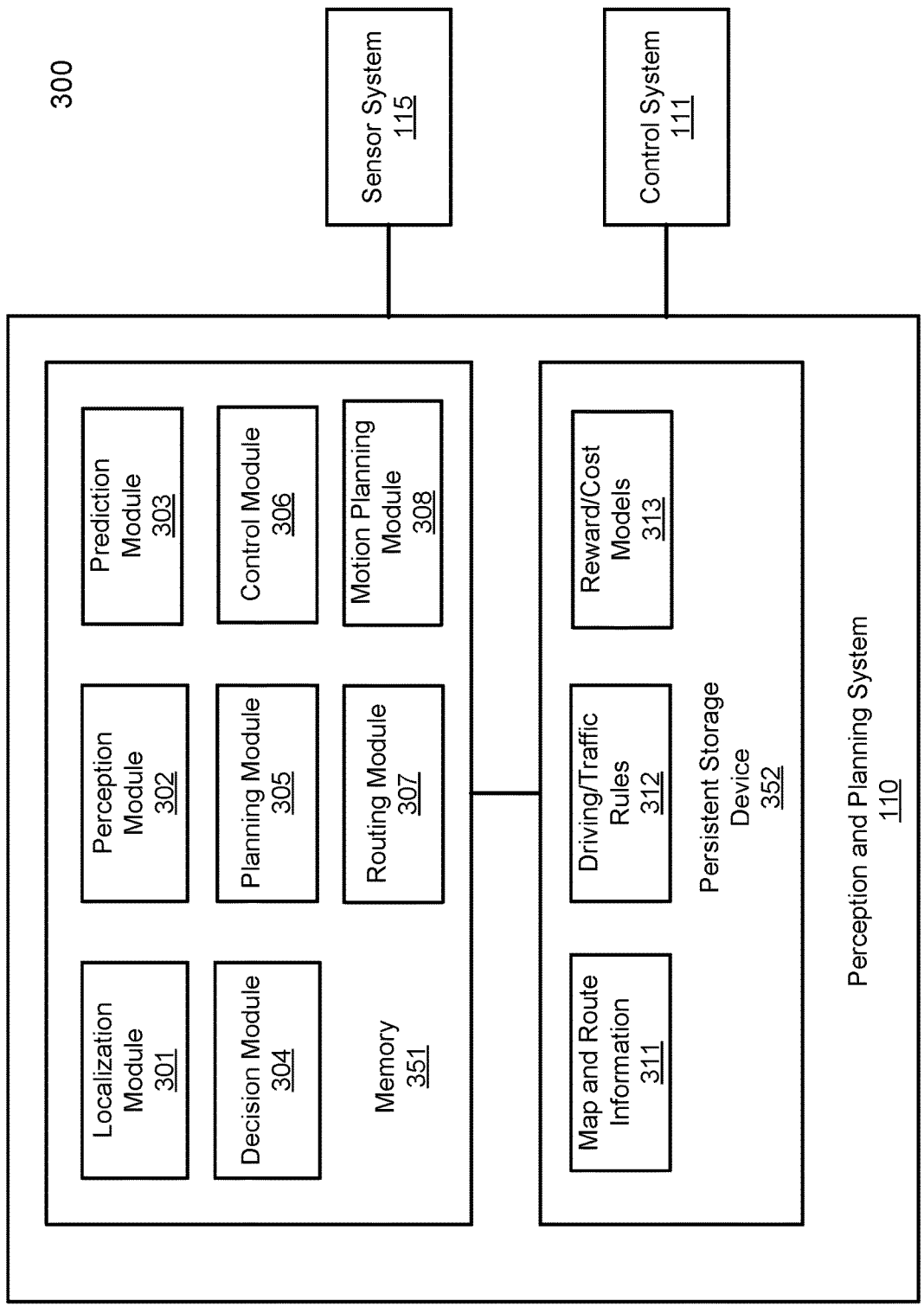
FIGS. 3A-3B are block diagrams illustrating examples of a perception and planning system used by an autonomous vehicle according to some embodiments.
Figure 3B:
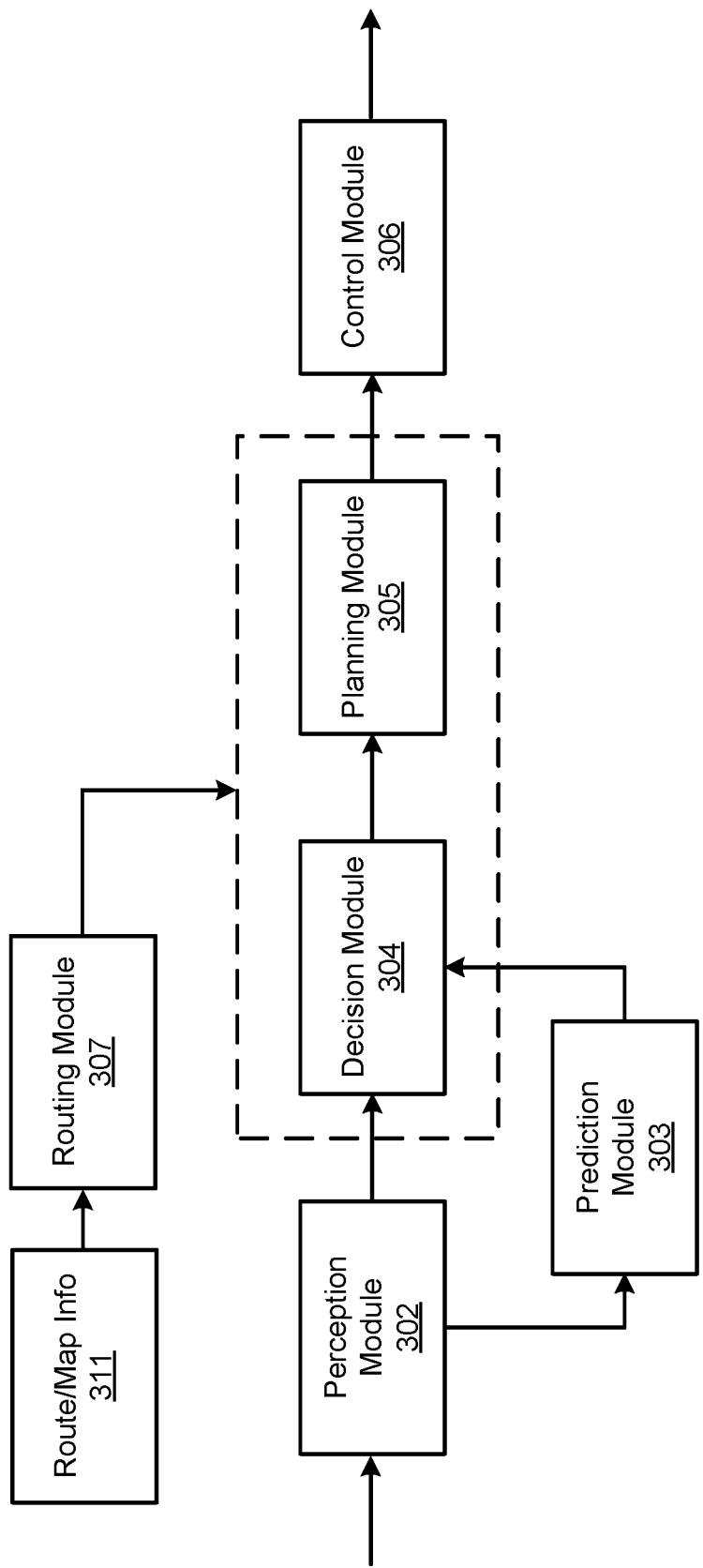

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing/sampling module 307, and motion planning module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, motion planning module 308 and planning module 305 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts how the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 4:
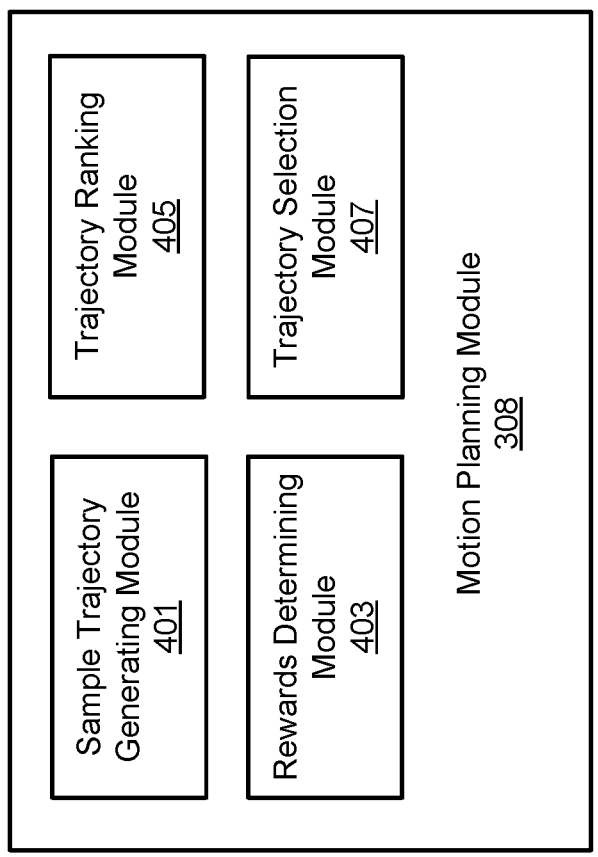
FIG. 4 is a block diagram illustrating an example of a motion planning module according to one embodiment.

FIG. 4 is a block diagram illustrating an example of a motion planning module according to one embodiment. Referring to FIG. 4, motion planning module 308 can generate a number of sample trajectories and select a trajectory from one of the sample trajectories to control an ADV, online. In one embodiment, motion planning module 308 includes sample trajectory generating module 401, rewards determining module 403, trajectory ranking module 405, and trajectory selection module 407. Sample trajectory generating module 401 can generate a number of sample trajectories based on a driving scenario. Rewards determining module 403 can determine a reward for a sample trajectory using a reward model. Trajectory ranking module 405 can rank the sample trajectories based on their rewards. Trajectory selection module 407 can select one of the sample trajectories according to their ranking to control the ADV.

In one embodiment, the reward model includes a model having a linear combination of predetermined features for a trajectory. For example, a reward/cost function can be:

$$C(w,F(A))=\Sigma_i w_i F_i(A),$$

where C is a reward/cost function, w is a weight, F(A) is a feature, and A is a trajectory.

In another embodiment, the reward model includes a machine learning model, such as a multi-layer perceptron (MLP) neural network model. In one embodiment, the neural network model can include an input layer, one or more hidden layers, and an output layer. The input layer can include a number of trajectory features. The hidden layers can be fully connected layers or partially connected layers coupling the input layer to the output layer. The output layer can be a cost or reward output value to evaluate a trajectory.

Note, the machine learning model may include, but is not limited to, neural networks (fully connected, partially connected, or a combination thereof), support vector machines (SVM), linear regression, k-nearest neighbors, naive bayes, k-means, and random forest models. A neural network is a machine learning model which can learn to perform tasks by considering examples (e.g., training with input/output scenarios), without being programmed with any task-specific rules. A neural network is a computational approach based on a large collection of neural units or neurons in a series of hidden layers or inner layers. Each hidden layer is made up of a set of neurons, where each neuron is connected to one or more neurons in the previous layer, and where neurons in a single layer can function completely independently and may not share any connections with other neurons of the layer. A neural network is self-learning and trained, rather than explicitly programmed.

Figure 5:
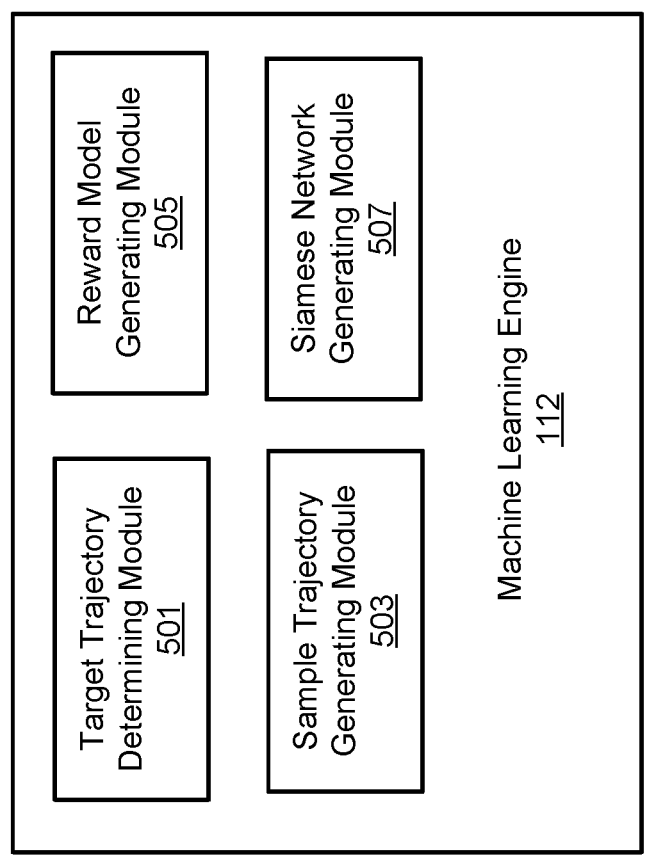
FIG. 5 is a block diagram illustrating an example of a machine learning engine according to one embodiment.

FIG. 5 is a block diagram illustrating an example of a machine learning engine according to one embodiment. Machine learning engine 112 can train a machine learning model offline. An example of a machine learning model is a MLP neural network model. Another example is a model having a linear combination of trajectory features. In one embodiment, machine learning engine 112 includes target trajectory determining module 501, sample trajectory generating module 503, reward model generating module 505, and Siamese network generating module 507. Target trajectory determining module 501 can determine (or select) a target trajectory, e.g., a demonstrative, or an expert trajectory for inverse reinforcement learning. Trajectory generating module 503 can generate a number of sample trajectories. Reward model generating module 505 can generate a reward model based on the target trajectory and the respective sample trajectories. For example, the target trajectory can be ranked highest among the sample trajectories using a reward model with many feature inputs and corresponding weight value inputs. The feature inputs vary depending on environment and ADV data for each of the trajectories, while the weight values can be optimized to rank the target trajectory to have a highest reward value or a lowest cost value. Siamese network generating module 507 can generate a Siamese network model for the reward model to compare, side by side, a sample trajectory with a target trajectory.

In one embodiment, the reward model can be generated using a rank-based conditional inverse reinforcement learning algorithm. Inverse reinforcement learning is a machine learning algorithm that learns an agent's objective or reward function by observing a demonstrative behavior (e.g., a target trajectory). For example, trajectories having different trajectory features (e.g., behaviors) for an ADV can be observed for a specific task (e.g., generation of a driving trajectory) and a reward function or model that describes a concrete goal or behaviors the agent (e.g., ADV system) tries to achieve can be generated using inverse reinforcement learning. A rank-based inverse reinforcement learning is a machine learning algorithm that ranks a number of possible sample behaviors (e.g., sample trajectories from a trajectory sample space) to learn an agent's objective or reward function in view of a demonstrative behavior (e.g., a target trajectory). A rank-based conditional inverse reinforcement learning algorithm is a rank-based inverse reinforcement learning algorithm conditional on a particular driving scenario. This way, learning can be performed scenario-wise which renders the learning more efficient. In one embodiment, a scenario can be a single image frame. In another embodiment, a scenario can be multiples of image frames.

Figure 6A:
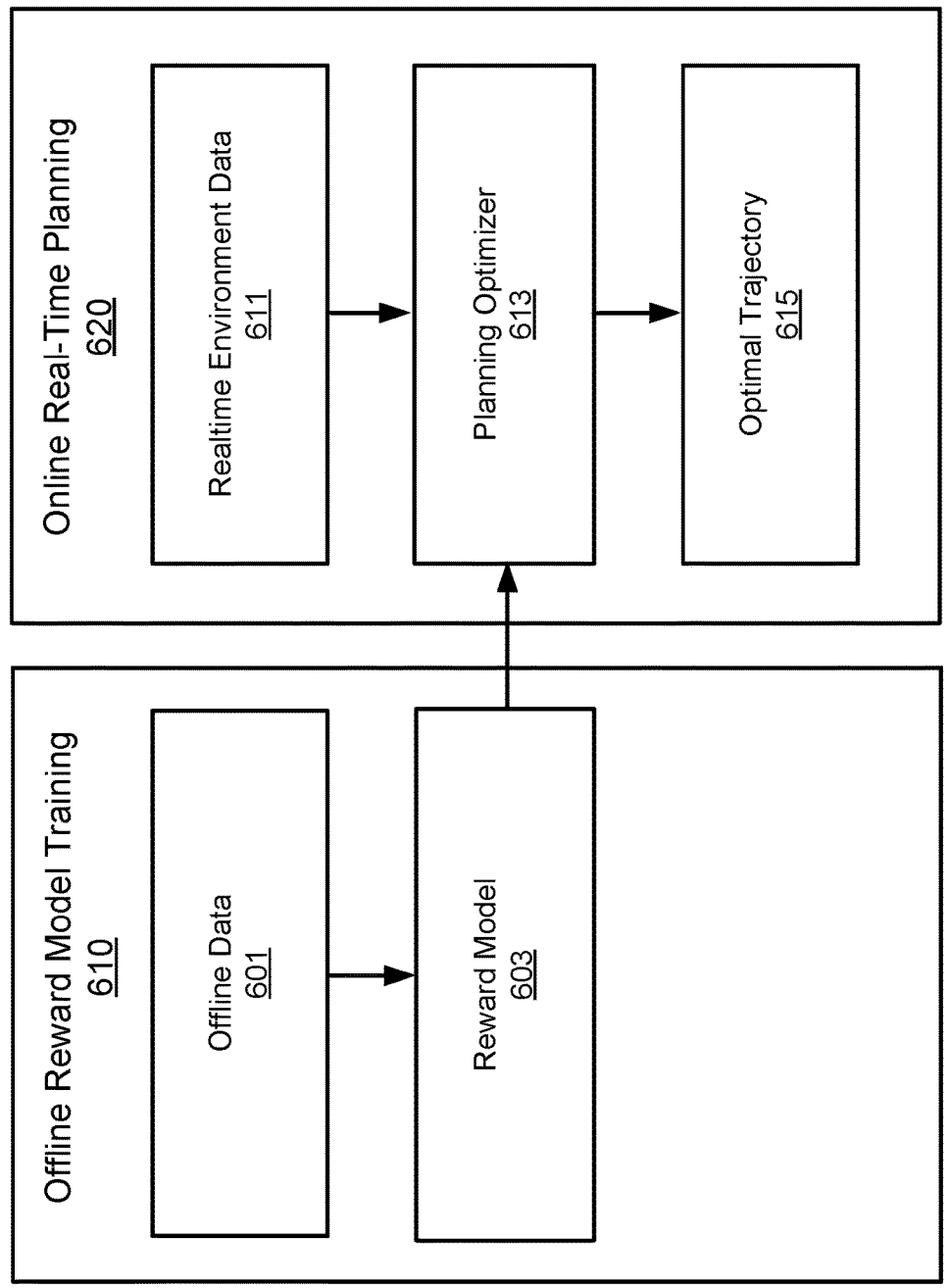
FIG. 6A illustrates an overview of an auto-tuning framework data pipeline for an ADV according to one embodiment.

FIG. 6A illustrates an overview of an auto-tuning framework data pipeline for an ADV according to one embodiment. Referring to FIG. 6A, framework data pipeline 600 includes two data pipelines: offline reward model training pipeline 610 and online real-time planning pipeline 620. Offline reward model training pipeline 610 can be a data pipeline for network training performed by a data analytics server, such as server 103 of FIG. 1. Pipeline 610 can gather offline data 601 (e.g., driving statistics, driving environment) which can be used to generate reward model 603. Pipeline 620 can receive the generated reward model 603 and gather real-time environment data 611. Planning optimizer 613 of pipeline 620 can then applying reward model 603 to the real-time environmental data 611 (e.g., driving environment, driving status and state of the ADV) to infer an optimal trajectory 615.

Figure 6B:
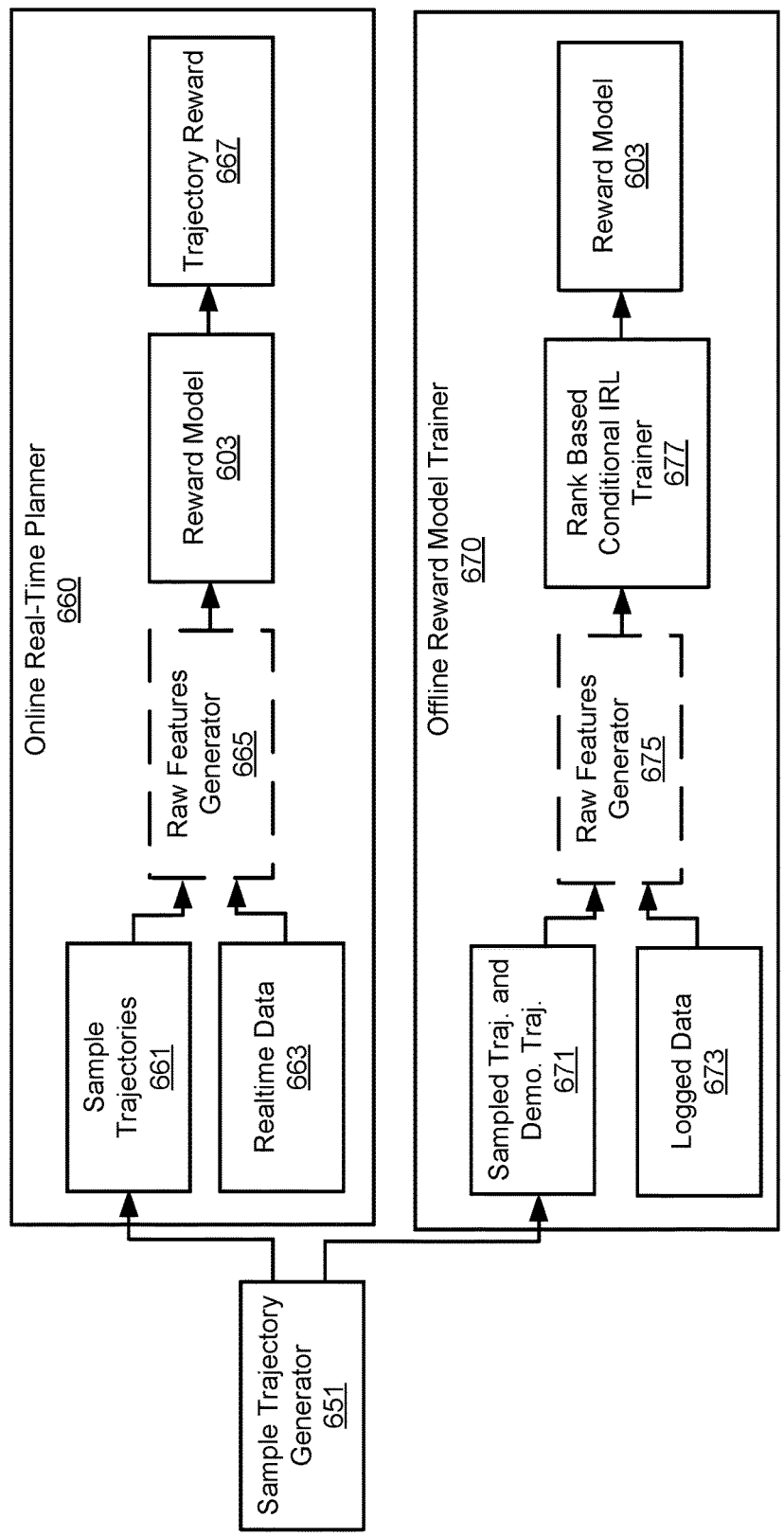
FIG. 6B illustrates an example of an auto-tuning framework for an ADV according to one embodiment.

FIG. 6B illustrates an example of an auto-tuning framework for an ADV according to one embodiment. Referring to FIG. 6B, framework 650 includes sample trajectory generator 651 (which can be part of a motion planning module, e.g., sample trajectory generating module 401 of FIG. 4, or a machine learning engine, e.g., module 503 of FIG. 5), online real-time planner 660, and offline reward model trainer 670.

Online real-time planner 660 can apply a reward model to infer an optimal driving trajectory. In one embodiment, online real-time planner 660 can be performed by motion planning module 308. Online real-time planner 660 can receive sample trajectories 661 and real-time data 663. Sample trajectories 661 can be a number of trajectories uniformly sampled from a trajectory sample space. The trajectory sample space can be derived from all possible driving trajectories for an ADV to maneuver based on a perceived real-time environment of the ADV, driving status, and state of the ADV. In this case, hidden trajectories or trajectories blocked by obstacles would not be in the trajectory sample space. Raw features generator 665 then extracts a number of raw features (function of trajectory) from each sample trajectories 663. Examples of raw features include, but not limited to: acceleration, jerk, and velocity of the sample trajectory or the target trajectory, smoothness of roadway, or a distance from the sample trajectory or the target trajectory to surrounding obstacles observed on the roadway, etc.

Based on the extracted raw features of each trajectory, planner 660 can determine trajectory reward 667 for the trajectory by applying reward model 603 to the trajectory. Planning 660 can rank the sample trajectories based on the determined rewards, determines a highest ranked trajectory based on the ranking, and select the highest ranked trajectory (e.g., lowest cost or highest reward) to control the ADV autonomously according to the highest ranked trajectory.

Offline reward model trainer 670 can train a reward model using a machine learning model. In one embodiment, offline reward model trainer 670 can be performed by machine learning engine 112. Offline reward model trainer 670 can receive sample trajectories/demonstrative trajectory 671 (e.g., target trajectory) and logged data 673 (environment data and driving data). Demonstrative trajectory 671 may be a single human driving trajectory, or a combination (e.g., an average) of a number of human driving trajectories. Sample trajectories can be trajectories uniformly or randomly sampled from a trajectory sample space. Logged data 673 can include data for a driving environment, scenario/frame information for a driving scenario/frame, and/or data about a status or state of the ADV.

For each of the sample trajectories and the demonstrative trajectory, raw feature generator 675 generates a number of corresponding raw features. Based on the features, rank based conditional IRL trainer 677 trains a reward model 603 to rank the demonstrative trajectory highest among the sample trajectories for each driving scenario. The trained reward model 603 can then be used by online real-time planner 660 to infer an optimal trajectory, online. In one embodiment, reward model 603 includes a neural network model, such as a multi-layer perceptron neural network model. In another embodiment, reward model includes a linear combination of raw features.

Figure 7:
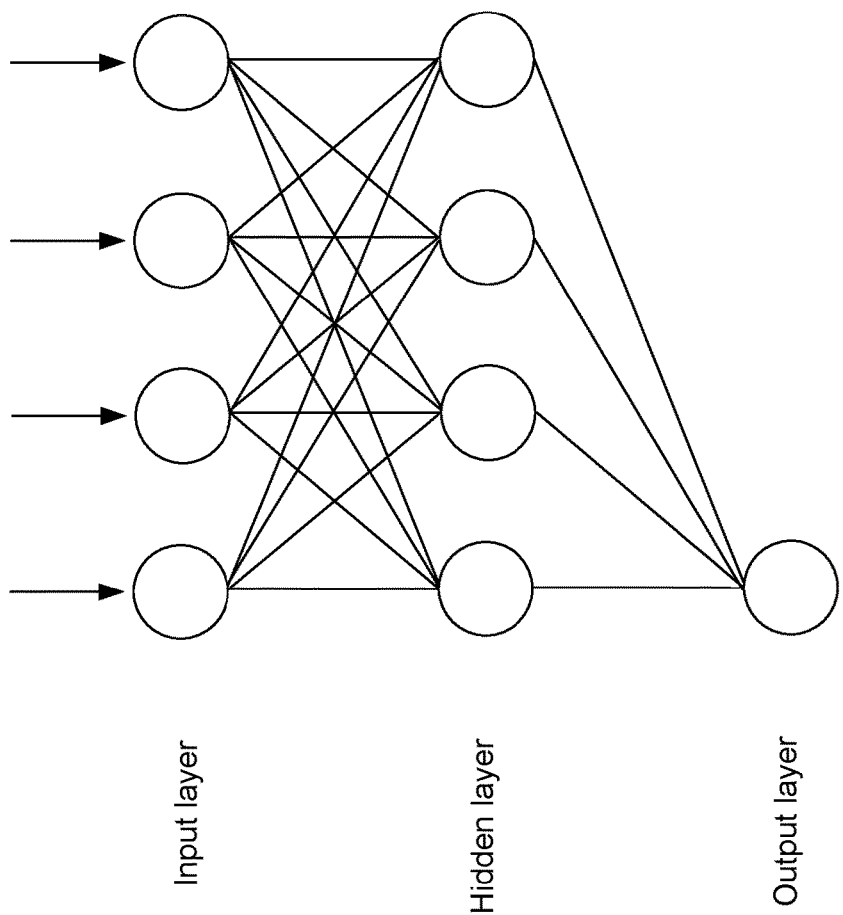
FIG. 7 illustrates an example of a multi-layer perceptron neural network model according to one embodiment.

FIG. 7 illustrates an example of a multi-layer perceptron neural network model according to one embodiment. Referring to FIG. 7, model 700 can be reward model 603 of FIGS. 6A-6B. In one embodiment, model 700 includes an input layer, a hidden layer, and an output layer. In one example, input layer includes four input features. Each input feature is connected to a node in the hidden layer. The number of nodes in the hidden layer is equal to the number of input features, e.g., four. The output layer includes a single node connected to each of the hidden nodes. The output for the output layer can be a reward or a cost value, e.g., C(w, F(A)), where C is a cost or reward, w is a weighting factor for a corresponding feature, F(A) is a feature, and A is a trajectory. Although only four input features are shown, model 700 can include any number of input features. As described above, examples of input features include, but not limited to, speed, acceleration, jerk, and smoothness of a trajectory, and distances of surrounding obstacles from the trajectory, etc.

Figure 8:
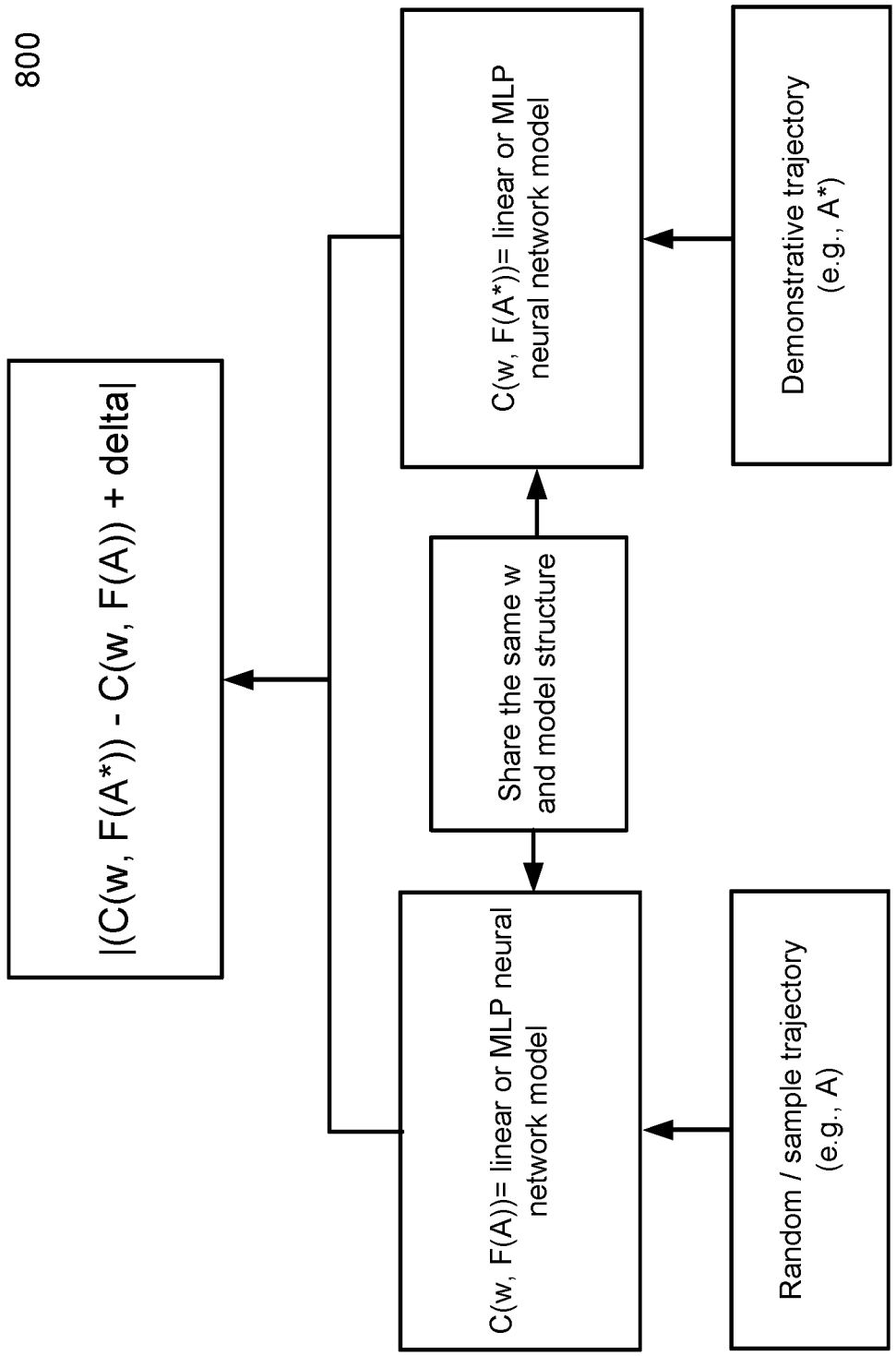
FIG. 8 illustrates an example of a Siamese network model according to one embodiment.

FIG. 8 illustrates an example of a Siamese network model according to one embodiment. A Siamese model can model a loss function for machine learning. Referring to FIG. 8, Siamese network model 800 can be used to measure a cost difference between a demonstrative trajectory and a sample trajectory based on a reward/cost function, e.g., C(w, F(A)), where C is a cost, w is weighting factor, F is a feature, and A is a trajectory. The Siamese network model 800 includes a first cost model and a second cost model (e.g., a linear cost model or a MLP network model). Both cost models share a similar model structure and weighting factors. The first cost model can receive a sample trajectory as an input. The second cost model can receive a demonstrative trajectory as an input. An example Siamese network model can be a function of an absolute value of a cost for a demonstrative trajectory (e.g., second cost model) minus a cost of a random sampled trajectory (e.g., first cost model) plus a small positive value, e.g.:

$$|C(w,F(A^*))-F(A))+delta|$$

where C is a cost or reward, w is a weighting factor for a corresponding feature, F(A) is a feature, A is a sample trajectory, A* is a demonstrative trajectory and delta is a small constant value. In one embodiment the demonstrative trajectory is an expert trajectory generated by on a collection of human driven trajectories.

A loss function can be applied by a machine learning algorithm to determine the weighting factors (e.g., w) by comparing different randomly or uniformly sampled trajectories with a single demonstrative (e.g., human driven) trajectory frame by frame. In one embodiment, a driving scenario is a frame. In each frame, hundreds of sample trajectories can be generated and compared. An example of a loss function can be:

$$argmin_w = sum_{frame} sum_{A \in \Omega} |C(w,F(A^*))-C(w,F(A))+delta|$$

where C is a cost or reward, w is a weighting factor for a corresponding feature, F(A) is a feature, A is a sample trajectory, A* is a demonstrative trajectory, delta is a small constant value, $\Omega$ is the trajectory sample space for a given frame. In one embodiment, each frame is a planning cycle.

An example machine learning algorithm, such as inverse reinforcement learning algorithm, can then be applied to the loss function, to determine one or more weighting factors for the reward model to place the demonstrative (e.g., target) trajectory in a highest ranking among the different sample trajectories, where each of the weighting factors correspond to a respective feature of the reward model.

Figure 9:
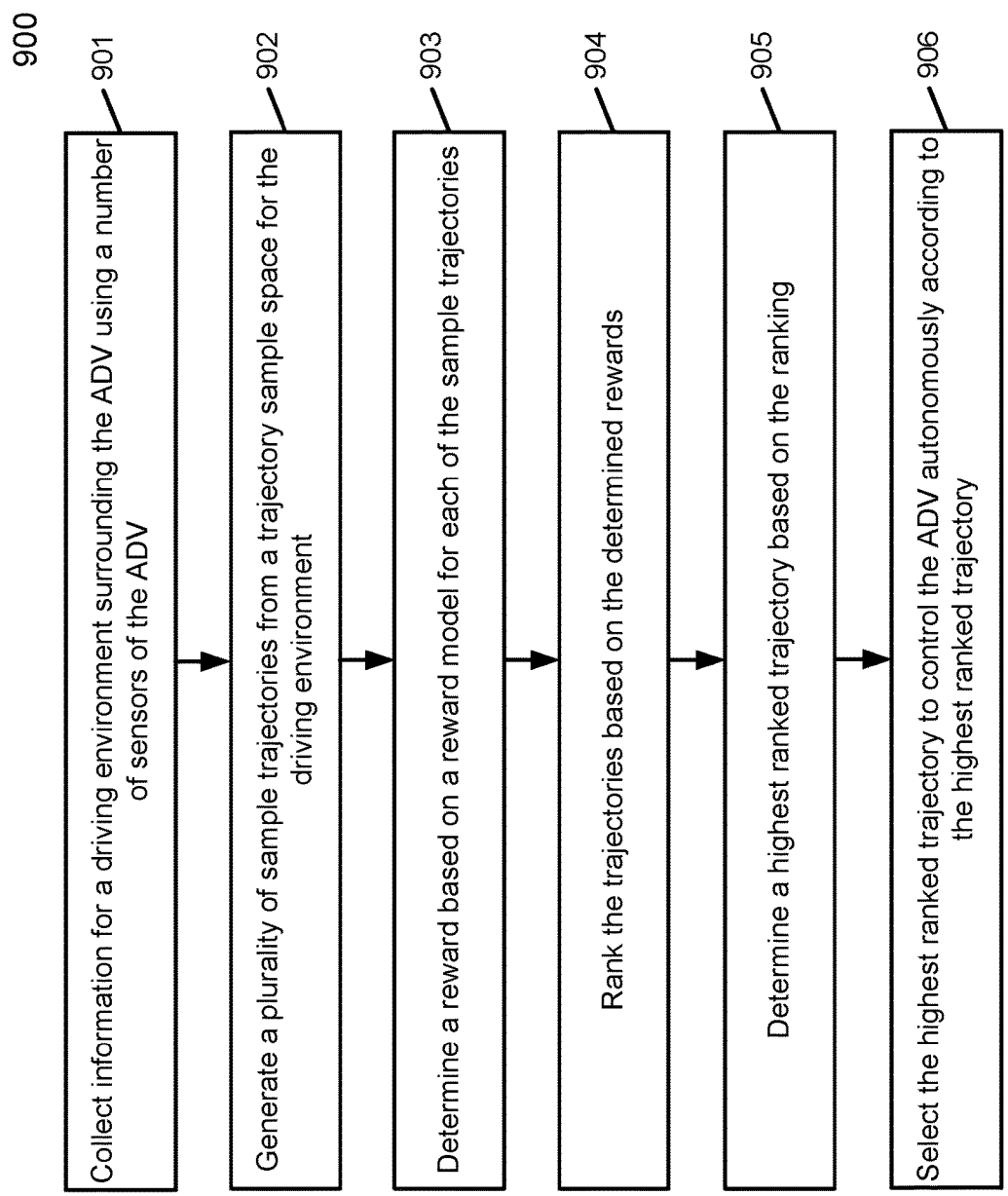
FIG. 9 is a flow diagram illustrating a method according to one embodiment.

FIG. 9 is a flow diagram illustrating a method according to one embodiment. Processing 900 may be performed by processing logic which may include software, hardware, or a combination thereof. For example, process 900 may be performed by motion planning module 308 of FIG. 3A. Referring to FIG. 9, at block 901, processing logic collects information for a driving environment surrounding the ADV using a number of sensors of the ADV. At block 902, processing logic generates a number of sample trajectories from a trajectory sample space for the driving environment. At block 903, processing logic determines a reward based on a reward model for each of the sample trajectories, where the reward model is generated using a rank based conditional inverse reinforcement learning algorithm. At block 904, processing logic ranks the sample trajectories based on the determined rewards. At block 905, processing logic determines a highest ranked trajectory based on the ranking. At block 906, processing logic selects the highest ranked trajectory to control the ADV autonomously according to the highest ranked trajectory.

In one embodiment, the reward model includes a machine learning model which includes a multi-layer perceptron neural network model. In another embodiment, the multi-layer perceptron neural network model includes an output layer to output a trajectory cost value.

In one embodiment, the reward model includes a model based on a linear combination of features for the driving environment. In another embodiment, the features include: acceleration, jerk, and velocity of the sample trajectory or the target trajectory, smoothness of roadway, or a distance from the sample trajectory or the target trajectory to surrounding obstacles observed on the roadway.

In one embodiment, the reward model is generated by: generating a Siamese network for the reward model based on the plurality of sample trajectories in the trajectory sampling space and a target trajectory, wherein the target trajectory is an expert trajectory, and applying an inverse reinforcement learning algorithm to the Siamese network to determine one or more weights for the reward model to place the target trajectory in a highest ranking among the plurality of sample trajectories, wherein each of the weights correspond to a respective feature for the reward model. In one embodiment, the expert trajectory is generated based on a collection of human driven trajectories.

In one embodiment, processing logic further determines a number of features for each of the sample trajectories, and where the reward for each of the sample trajectories is determined based on the plurality of features. In one embodiment, the number of sample trajectories is generated uniformly based on information for a driving environment of the ADV.

Figure 10:
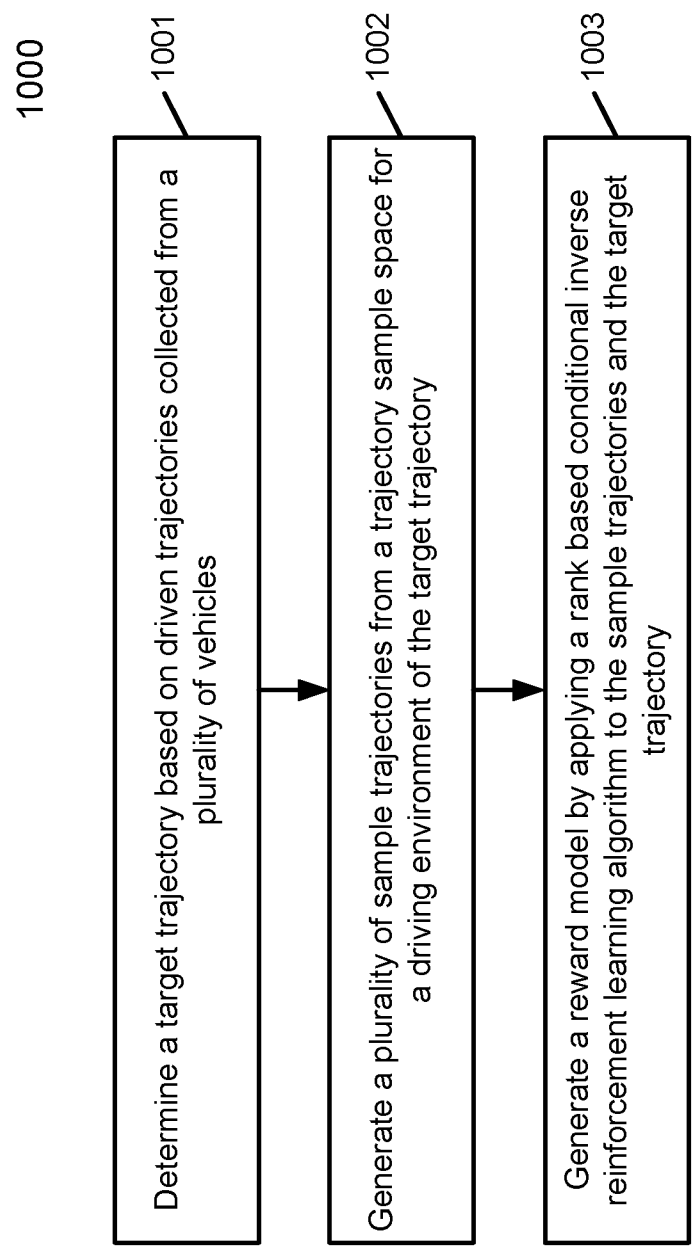
FIG. 10 is a flow diagram illustrating a method according to one embodiment.

FIG. 10 is a flow diagram illustrating a method according to one embodiment. Processing 1000 may be performed by processing logic which may include software, hardware, or a combination thereof. For example, process 1000 may be performed by machine learning engine 112 of FIG. 5. Referring to FIG. 10, at block 1001, processing logic determines a target trajectory based on driven trajectories collected from one or more vehicles. At block 1002, processing logic generates a number of sample trajectories from a trajectory sample space for a driving environment of the target trajectory. At block 1003, processing logic generates a reward model by applying a rank based conditional inverse reinforcement learning algorithm to the sample trajectories and the target trajectory.

In one embodiment, the reward model includes a machine learning model which includes a multi-layer perceptron neural network model. In another embodiment, the multi-layer perceptron neural network model includes an output layer to output a trajectory cost value.

In one embodiment, the reward model includes a model based on a linear combination of features for the driving environment. In another embodiment, the features include: acceleration, jerk, and velocity of the sample trajectory or the target trajectory, smoothness of roadway, or a distance from the sample trajectory or the target trajectory to surrounding obstacles observed on the roadway.

In one embodiment, generating a reward model by applying a rank based conditional inverse reinforcement learning algorithm includes: generating a Siamese network for the reward model based on the number of sample trajectories in the trajectory sampling space and a target trajectory, and applying an inverse reinforcement learning algorithm to the Siamese network to determine one or more weighting factors for the reward model to place the target trajectory in a highest ranking among the number of sample trajectories, where each of the weighting factors correspond to a respective feature for the reward model. In another embodiment, the expert trajectory is generated based on a collection of human driven trajectories.

In one embodiment, processing logic further determines a number of features for each of the sample trajectories, and where the reward model is generated based on the plurality of features. In one embodiment, the number of sample trajectories are generated uniformly based on information for the driving environment of the target trajectory.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 11:
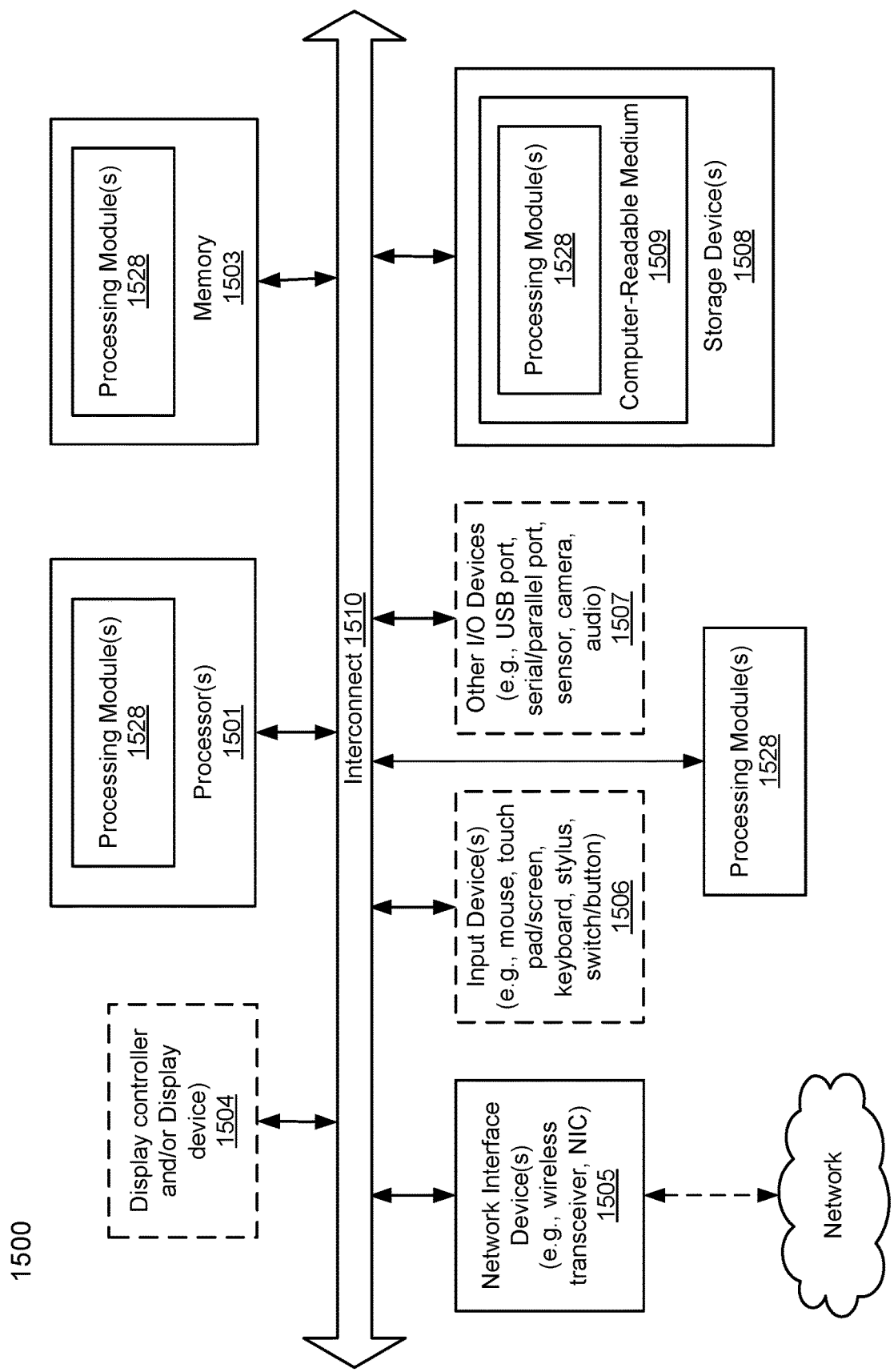
FIG. 11 is a block diagram illustrating a data processing system according to one embodiment.

FIG. 11 is a block diagram illustrating an example of a data processing system which may be used with one embodiment of the disclosure. For example, system 1500 may represent any of data processing systems described above performing any of the processes or methods described above, such as, for example, perception and planning system 110 or servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, motion planning module 308 of FIG. 3A or machine learning engine 112 of FIG. 5. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to generate a motion planning cost function for an autonomous driving vehicle (ADV), the method comprising:
    collecting information for a driving environment surrounding the ADV using a plurality of sensors of the ADV;
    generating a plurality of sample trajectories from a trajectory sample space for the driving environment;
    determining a reward based on a reward model for each of the sample trajectories, wherein the reward model is generated using a rank based conditional inverse reinforcement learning algorithm, wherein the rank based conditional inverse reinforcement learning algorithm is a rank based inverse reinforcement learning conditional on a driving scenario such that the conditional inverse reinforcement learning algorithm is trainable scenario-wise, wherein the driving scenario includes a frame of a planning cycle;
    wherein the reward model is also generated by:
    generating a Siamese network for the reward model based on the plurality of sample trajectories in the trajectory sampling space and a target trajectory, wherein the target trajectory is an expert trajectory; and
    applying an inverse reinforcement learning algorithm to the Siamese network to determine one or more weighting factors for the reward model to place the target trajectory in a highest ranking among the plurality of sample trajectories, wherein each of the weighting factors correspond to a respective feature for the reward model;
    ranking the sample trajectories based on the determined rewards;
    determining a highest ranked trajectory based on the ranking, from the sample trajectories based on the ranking; and
    controlling the ADV autonomously according to the highest ranked trajectory.

2. The method of claim 1, wherein the reward model comprises a machine learning model comprises a multi-layer perceptron neural network model.

3. The method of claim 2, wherein the multi-layer perceptron neural network model includes an output layer to output a trajectory cost value.

4. The method of claim 1, wherein the reward model comprises a model based on a linear combination of features for the driving environment.

5. The method of claim 4, wherein the features comprise: acceleration, jerk, and velocity of the sample trajectory or a target trajectory, smoothness of roadway, or a distance from the sample trajectory or the target trajectory to surrounding obstacles observed on the roadway.

6. The method of claim 1, wherein the expert trajectory is generated based on a collection of human driven trajectories.

7. The method of claim 1, further comprising determining a plurality of features for each of the sample trajectories, and wherein the reward for each of the sample trajectories is determined based on the plurality of features.

8. The method of claim 1, wherein the plurality of sample trajectories is generated uniformly based on information for a driving environment of the ADV.

9. A non-transitory machine-readable medium having instructions stored therein, which when executed by a processor, cause the processor to perform operations, the operations comprising:
    collecting information for a driving environment surrounding the ADV using a plurality of sensors of the ADV;
    generating a plurality of sample trajectories from a trajectory sample space for the driving environment;
    determining a reward based on a reward model for each of the sample trajectories, wherein the reward model is generated using a rank based conditional inverse reinforcement learning algorithm, wherein the rank based conditional inverse reinforcement learning algorithm is a rank based inverse reinforcement learning conditional on a driving scenario such that the conditional inverse reinforcement learning algorithm is trainable scenario-wise, wherein the driving scenario includes a frame of a planning cycle;
    wherein the reward model is also generated by:
    generating a Siamese network for the reward model based on the plurality of sample trajectories in the trajectory sampling space and a target trajectory, wherein the target trajectory is an expert trajectory; and
    applying an inverse reinforcement learning algorithm to the Siamese network to determine one or more weighting factors for the reward model to place the target trajectory in a highest ranking among the plurality of sample trajectories, wherein each of the weighting factors correspond to a respective feature for the reward model;
    ranking the sample trajectories based on the determined rewards;
    determining a highest ranked trajectory based on the ranking, from the sample trajectories based on the ranking; and
    controlling the ADV autonomously according to the highest ranked trajectory.

10. The non-transitory machine-readable medium of claim 9, wherein the expert trajectory is generated based on collected human driven trajectories.

11. The non-transitory machine-readable medium of claim 9, wherein the operations further comprise: determining a plurality of features for each of the sample trajectories, and wherein the reward for each of the sample trajectories is determined based on the plurality of features.

12. The non-transitory machine-readable medium of claim 9, wherein the plurality of sample trajectories are generated uniformly based on information for a driving environment of the ADV.

13. A computer-implemented method to train a rewards model for an autonomous driving vehicle (ADV), the method comprising:
    determining a target trajectory based on driven trajectories collected from one or more vehicles;
    generating a plurality of sample trajectories from a trajectory sample space for a driving environment of the target trajectory; and
    generating a reward model by applying a rank based conditional inverse reinforcement learning algorithm to the sample trajectories and the target trajectory, wherein the reward model is used by an ADV to generate a driving trajectory to control the ADV, wherein the rank based conditional inverse reinforcement learning algorithm is a rank based inverse reinforcement learning conditional on a driving scenario such that the conditional inverse reinforcement learning algorithm is trainable scenario-wise, wherein the driving scenario includes a frame of a planning cycle;
    wherein generating a reward model also includes applying a rank based conditional inverse reinforcement learning algorithm comprises: generating a Siamese network for the reward model based on the plurality of sample trajectories in the trajectory sampling space and a target trajectory; and
    applying an inverse reinforcement learning algorithm to the Siamese network to determine one or more weighting factors for the reward model to place the target trajectory in a highest ranking among the plurality of sample trajectories, wherein each of the weighting factors correspond to a respective feature for the reward model, and
    ranking the sample trajectories based on the determined rewards;
    determining a highest ranked trajectory based on the ranking, from the sample trajectories based on the ranking; and
    controlling the ADV autonomously according to the highest ranked trajectory.

14. The method of claim 13, wherein the reward model comprises a machine learning model comprises a multi-layer perceptron neural network model.

15. The method of claim 14, wherein the multi-layer perceptron neural network model includes an output layer to output a trajectory cost value.

16. The method of claim 13, wherein the reward model comprises a model based on a linear combination of features for the driving environment.

17. The method of claim 16, wherein the features comprise: acceleration, jerk, and velocity of the sample trajectory or the target trajectory, smoothness of roadway, or a distance from the sample trajectory or the target trajectory to surrounding obstacles observed on the roadway.

18. The method of claim 13, wherein the expert trajectory is generated based on a collection of human driven trajectories.

19. The method of claim 13, further comprising determining a plurality of features for each of the sample trajectories, and wherein the reward model is generated based on the plurality of features.

20. The method of claim 13, wherein the plurality of sample trajectories are generated uniformly based on information for the driving environment of the target trajectory.

* * * * *